(12) United States Patent
Xie

(10) Patent No.: US 10,996,682 B2
(45) Date of Patent: May 4, 2021

(54) METHOD AND APPARATUS FOR PERFORMING CLEANING OPERATION BY CLEANING DEVICE AND READABLE STORAGE MEDIUM

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 327 days.

(21) Appl. No.: 16/019,391

(22) Filed: Jun. 26, 2018

(65) Prior Publication Data
US 2019/0011923 A1 Jan. 10, 2019

(30) Foreign Application Priority Data
Jul. 6, 2017 (CN) .......................... 201710546916.0

(51) Int. Cl.
A47L 9/28 (2006.01)
G05D 1/02 (2020.01)
A47L 11/40 (2006.01)

(52) U.S. Cl.
CPC ............ *G05D 1/028* (2013.01); *A47L 9/2847* (2013.01); *A47L 9/2852* (2013.01); *A47L 9/2857* (2013.01); *A47L 11/4011* (2013.01); *G05D 1/0219* (2013.01); *G05D 1/0274* (2013.01); *A47L 2201/04* (2013.01); *A47L 2201/06* (2013.01); *G05D 2201/0215* (2013.01)

(58) Field of Classification Search
CPC .. A47L 11/4011; A47L 9/2847; A47L 9/2857; A47L 9/2852; A47L 2201/04; A47L 2201/06; G05D 1/028; G05D 1/0219; G05D 1/0274; G05D 2201/0215
See application file for complete search history.

(56) References Cited

U.S. PATENT DOCUMENTS

| 8,705,842 B2 | 4/2014 | Lee |
| 2005/0010649 A1 | 1/2005 | Payne |
| 2005/0022273 A1* | 1/2005 | Maeki ............... G05D 1/028 701/300 |
| 2005/0171636 A1* | 8/2005 | Tani ............... G05D 1/0276 700/245 |

(Continued)

FOREIGN PATENT DOCUMENTS

| CN | 103792944 A | 5/2014 |
| CN | 204091882 U | 1/2015 |

(Continued)

OTHER PUBLICATIONS

Decision of Refusal of the Japanese application No. 2018-547303, dated Mar. 5, 2020.

(Continued)

*Primary Examiner* — Stephen Holwerda
(74) *Attorney, Agent, or Firm* — Syncoda LLC; Feng Ma

(57) ABSTRACT

A method for performing a cleaning operation with a cleaning device includes: determining whether the cleaning device and a terminal are located in a same general area; acquiring a first geographical location at which the terminal is currently located; and performing the cleaning operation according to the first geographical location and a specified cleaning mode.

13 Claims, 10 Drawing Sheets

```
┌─────────────────────────────────────────────┐
│  Determine whether the cleaning device and  │
│  the smart control device are located in a  │ ─── 201
│  same general area, the smart device being  │
│            Worn by the user                 │
└─────────────────────────────────────────────┘
                      │
                      ▼
┌─────────────────────────────────────────────┐
│  Acquire a first geographical location at   │
│  which the smart control device is          │
│  currently located, the cleaning device     │ ─── 202
│  and the smart Control device being         │
│  located in the same general area           │
└─────────────────────────────────────────────┘
                      │
                      ▼
┌─────────────────────────────────────────────┐
│  Perform a cleaning operation according to  │ ─── 203
│  the first geographical location and a      │
│  specified cleaning mode                    │
└─────────────────────────────────────────────┘
```

(56) References Cited

U.S. PATENT DOCUMENTS

| | | | |
|---|---|---|---|
| 2012/0106829 A1 | 5/2012 | Lee | |
| 2012/0259481 A1* | 10/2012 | Kim | G05D 1/0044 701/2 |
| 2013/0060379 A1 | 3/2013 | Choe | |
| 2015/0375395 A1* | 12/2015 | Kwon | H02J 50/90 700/245 |
| 2016/0274580 A1* | 9/2016 | Jung | G05D 1/0016 |
| 2017/0020356 A1 | 1/2017 | Zhang et al. | |
| 2017/0164803 A1 | 6/2017 | Han | |

FOREIGN PATENT DOCUMENTS

| | | | | |
|---|---|---|---|---|
| CN | 104757909 | A | 7/2015 | |
| CN | 105068540 | A | 11/2015 | |
| CN | 105559696 | A | 5/2016 | |
| CN | 105640443 | A | 6/2016 | |
| CN | 106227207 | A | 12/2016 | |
| CN | 106618386 | A | 5/2017 | |
| CN | 107224249 | A | 10/2017 | |
| EP | 2450762 | A2 | 5/2012 | |
| EP | 3029537 | A1 | 6/2016 | |
| JP | 2014071845 | A | 4/2014 | |
| JP | 2016131888 | A | 7/2016 | |
| JP | 2016214673 | A | 12/2016 | |
| KR | 20170070607 | A | 6/2017 | |
| WO | 2011054284 | A1 | 5/2011 | |
| WO | WO-2015060672 | A1 * | 4/2015 | A47L 11/24 |
| WO | 2016090830 | A1 | 6/2016 | |

OTHER PUBLICATIONS

English translation of the Written Opinion of the International Search Authority in the international application No. PCT/CN2017/114149, dated Apr. 2, 2019.
Notice of Allowance of the Russian application No. 2018140696/12(067630), dated Jun. 27, 2019.
International Search Report in international application No. PCT/CN2017/114149, dated Apr. 2, 2018.
Written Opinion of the International Search Authority in international application No. PCT/CN2017/114149, dated Apr. 2, 2018.
Notification of the First Office Action of Chinese application No. 201710546916.0, dated Jun. 21, 2018.
European Search Report in European application No. 18182153.9, dated Nov. 19, 2018.
First Office Action of the Korean application No. 10-2019-7030930, dated Jan. 4, 2021.

* cited by examiner

METHOD AND APPARATUS FOR PERFORMING CLEANING OPERATION BY CLEANING DEVICE AND READABLE STORAGE MEDIUM

CROSS-REFERENCE TO RELATED APPLICATIONS

This application claims priority to Chinese patent application No. 201710546916.0 filed before the Chinese Patent Office on Jul. 6, 2017, the disclosure of which is hereby incorporated by reference in its entirety.

BACKGROUND

To improve comfort and convenience at home and in office spaces, a large number of smart home devices have emerged. One such a type of devices is a smart cleaning device capable of automatically performing indoor cleaning and dust removal. The smart cleaning device may also be referred to as a robot cleaner, an automatic cleaner, a smart dust collector, etc. In general, the smart cleaning device is an automation technology-based movable device, and thus can automatically move about in a room and automatically clean the room. For example, the smart cleaning device can perform cleaning along the edges and automatically turn at corners or encountering obstacles in a room when performing a cleaning. In some other modes of operations, the smart cleaning device can perform random spot cleaning, or take other walk patterns.

SUMMARY

The present disclosure relates generally to the field of smart home, and more particularly to a method and apparatus for performing a cleaning operation with a cleaning device, and a computer-readable storage medium. In some embodiments, a diversified cleaning operation performing manner can be achieved with a "smarter" device, significantly improving upon existing cleaning devices that generally perform cleaning operations in an undiversified manner.

In an aspect, a method for performing a cleaning operation with a cleaning device is provided, the method including: determining whether the cleaning device and a terminal are located in a same general area; acquiring a first geographical location at which the terminal is currently located; and performing the cleaning operation according to the first geographical location and a specified cleaning mode.

In some embodiments, the performing the cleaning operation according to the first geographical location and the specified cleaning mode include: if the specified cleaning mode is a first cleaning mode, determining a first geographical area in which the terminal is currently located, according to the first geographical location; and controlling the cleaning device to perform the cleaning operation in one or more areas other than the first geographical area.

In some embodiments, the method further includes: acquiring a map of the general area in which the cleaning device is currently located; determining, based on the map, spatial boundaries of one or more geographical areas of the general area; and storing corresponding relationships between the geographical areas and the spatial boundaries; wherein the determining the first geographical area includes: determining whether the first geographical location is in one set of the spatial boundaries in the corresponding relationships; and if so, determining a geographical area corresponding to the one set of spatial boundaries as the first geographical area.

In some embodiments, the performing the cleaning operation according to the first geographical location and the specified cleaning mode includes: if the specified cleaning mode is a second cleaning mode, determining whether a distance between the first geographical location and a second geographical location at which the cleaning device is currently located is not smaller than a preset threshold value; and if so, performing the cleaning operation according to a movement trajectory of the terminal, wherein the second cleaning mode is a tracking-type cleaning during which the distance between the cleaning device and the terminal is not smaller than the preset threshold value.

In some embodiments, the performing the cleaning operation according to the movement trajectory of the terminal includes: acquiring the movement trajectory of the terminal; during the cleaning operation performed according to the movement trajectory, acquiring a current distance between the cleaning device and the terminal in real time; and if the current distance between the cleaning device and the terminal is smaller than the preset threshold value, controlling the cleaning device to move gradually farther away from the terminal until the current distance between the cleaning device and the terminal is at least the preset threshold value, and continuing to perform the cleaning operation according to the movement trajectory.

In some embodiments, the performing the cleaning operation according to the first geographical location and the specified cleaning mode includes: if the specified cleaning mode is a second cleaning mode, determining whether a distance between the first geographical location and the second geographical location at which the cleaning device is currently located is not smaller than a preset threshold value; if so, determining the first geographical area in which the terminal is currently located according to the first geographical location; and performing the cleaning operation in the first geographical area.

In some embodiments, the performing the cleaning operation in the first geographical area includes: acquiring a current distance between the cleaning device and the terminal in real time during the cleaning operation in the first geographical area; and if the current distance between the cleaning device and the terminal is smaller than the preset threshold value, controlling the cleaning device to move gradually farther away from the terminal until the current distance between the cleaning device and the terminal is at least the preset threshold value, and continuing to perform the cleaning operation in the first geographical area.

In some embodiments, the performing the cleaning operation according to the first geographical location and the specified cleaning mode includes: determining a first geographical area in which the terminal is currently located according to the first geographical location; determining a duration of stay of the user in the first geographical area; acquiring a specified cleaning strength grade based on the duration of stay according to preset corresponding relationships between durations of stay and cleaning strength grades; and performing the cleaning operation according to the specified cleaning strength grade and the specified cleaning mode.

In some embodiments, the method further includes determining whether the terminal is being worn by the user based on one or more measured user parameters.

In some embodiments, the method further includes: collecting user data; building a user profile based on the collected user data; and determining the specified cleaning mode based on the user profile.

In another aspect, a cleaning apparatus configured to perform the method includes: a processor; and a memory device configured to store a set of instructions executable by the processor, wherein the processor is configured, based on the instructions, to: determine whether the apparatus and a terminal are located in a same general area; acquire a first geographical location at which the terminal is currently located; and perform the cleaning operation according to the first geographical location and a specified cleaning mode.

In some embodiments, the processor is further configured to: if the specified cleaning mode is a first cleaning mode, determine a first geographical area in which the terminal is currently located according to the first geographical location; and control the apparatus to perform the cleaning operation in one or more areas other than the first geographical area, wherein the first cleaning mode is an avoidance-type cleaning during which the apparatus performs the cleaning operation in the one or more areas other than the first geographical area.

In some embodiments, the processor is further configured to: acquire a map of a general area in which the apparatus is currently located; determine spatial boundaries of one or more geographical areas in the general area in which the apparatus is currently located according to the map; store corresponding relationships between the geographical areas and the spatial boundaries; and determine whether the first geographical location is in one set of the spatial boundaries in the corresponding relationships, and if so, determine a geographical area corresponding to the one set of spatial boundaries as the first geographical area.

In some embodiments, the processor is further configured to: if the specified cleaning mode is a second cleaning mode, determine whether a distance between the first geographical location and a second geographical location at which the apparatus is currently located is not smaller than a preset threshold value, and if so, perform the cleaning operation according to a movement trajectory of the terminal, wherein the second cleaning mode is tracking-type cleaning in which the distance between the apparatus and the terminal is not smaller than the preset threshold value; acquire the movement trajectory of the terminal; acquire a current distance between the apparatus and the terminal in real time during the cleaning operation performed according to the movement trajectory; and if the current distance between the apparatus and the terminal is smaller than the preset threshold value, control the apparatus to move gradually farther away from the terminal until the current distance between the apparatus and the terminal is at least the preset threshold value, and continue to perform the cleaning operation according to the movement trajectory.

In some embodiments, the processor is further configured to: if the specified cleaning mode is a second cleaning mode, determine whether a distance between the first geographical location and a second geographical location at which the apparatus is currently located is not smaller than a preset threshold value; if so, determine a first geographical area in which the terminal is currently located according to the first geographical location; perform the cleaning operation in the first geographical region; acquire a current distance between the apparatus and the terminal in real time during cleaning the first geographical area; if the current distance between the apparatus and the terminal is smaller than the preset threshold value, control the apparatus to move gradually farther away from the terminal until the current distance between the apparatus and the terminal is at least the preset threshold value, and continue to perform the cleaning operation in the first geographical area.

In some embodiments, the apparatus further includes: a determining portion configured to determine whether the apparatus and the terminal are located in the same general area; a first acquisition portion configured to obtain the first geographical location of the terminal; an execution portion configured to determine the first geographical region in which the terminal is currently located according to the first geographical location, determine a specified staying duration of the user in the first geographical area, acquire a specified cleaning strength grade matching the specified duration of stay according to preset corresponding relationships between the durations of stay and cleaning strength grades, and perform the cleaning operation according to the specified cleaning strength grade and the specified cleaning mode; a main body; a sensing system including at least one of an ultrasonic sensor, an infrared sensor, a magnetometer, an accelerometer, a gyroscope, or an odometer; a control system including the execution portion; a driving system; a cleaning system; and a buffer disposed at a front portion of the main body.

In another aspect, a non-transitory computer-readable storage medium is provided having a set of computer program instructions stored thereon, wherein the computer program instructions are executed by a processor to implement a method for performing a cleaning operation with a cleaning device, wherein the method includes: determining whether the cleaning device and a terminal are located in a same general area; acquiring a first geographical location at which the terminal is currently located; and performing the cleaning operation according to the first geographical location and a specified cleaning mode.

In some embodiments, the performing the cleaning operation according to the first geographical location and the specified cleaning mode includes: if the specified cleaning mode is a first cleaning mode, determining a first geographical area at which the terminal is currently located, according to the first geographical location; and controlling the cleaning device to perform the cleaning operation in one or more areas other than the first geographical area, wherein the first cleaning mode is an avoidance-type cleaning during which the cleaning device performs the cleaning operation in the one or more areas other than the first geographical area.

In some embodiments, the method further includes: acquiring a map of the general area in which the cleaning device is currently located; determining, according to the map, spatial boundaries of one or more geographical areas in the general area in which the cleaning device is currently located; storing corresponding relationships between the geographical areas and the spatial boundaries; wherein the determining the first geographical area in which the terminal is currently located according to the first geographical location includes: determining whether the first geographical location is in one set of the spatial boundaries in the corresponding relationships; and if so, determining a geographical area corresponding to the one set of the spatial boundaries as the first geographical area.

In some embodiments, the performing the cleaning operation according to the first geographical location and the specified cleaning mode includes: if the specified cleaning mode is a second cleaning mode, determining whether a distance between the first geographical location and a second geographical location at which the cleaning device is currently located is not smaller than a preset threshold value; and if so, performing the cleaning operation according to a movement trajectory of the terminal, wherein the second cleaning mode is a tracking-type cleaning during which the distance between the cleaning device and the terminal is not smaller than the preset threshold value; the method further including: determining whether the terminal is being worn by the user based on one or more measured user parameters; collecting user data; building a user profile based on the collected user data; and determining the specified cleaning mode based on the user profile.

It should be understood that the above general descriptions and the detailed descriptions below are only exemplary and explanatory and not intended to limit the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

An implementation scenario of some embodiments of the present disclosure will be described first in a simplified manner with reference to FIG. 1.

Figure 1:
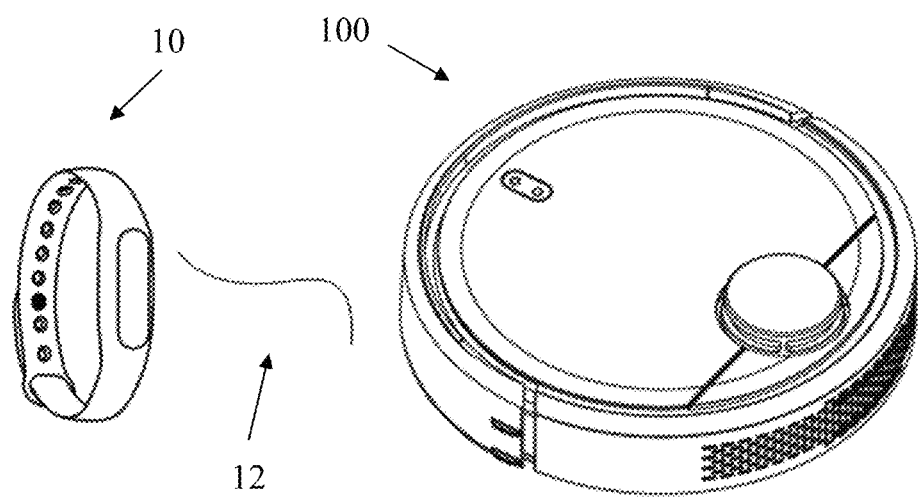
FIG. 1 is a diagram of an implementation scenario involved in a method for performing a cleaning operation with a cleaning device according to some embodiments.

FIG. 1 is a diagram of an implementation scenario involved in a method for performing a cleaning operation with a cleaning device, according to some embodiments of the present disclosure. As shown, two devices are involved in this illustrative scenario, including a cleaning device 100 and a terminal, such as a smart control device 10. The smart control device 10 can be, for example, a smart mobile terminal such as a user handheld mobile phone, a smart wearable device such as a smart bracelet or a smart watch, etc.

According to some embodiments, if the smart control device 10 and the cleaning device 100 are located in relatively close proximity, such as within a same house, a wireless connection 12 such as a Wireless Fidelity (WiFi) connection can be established between the smart control device 10 and the cleaning device 100.

In some other embodiments, a connection can be established between the smart control device 10 and the cleaning device 10 through telecommunication networks such as cellular networks, or the Internet. In this scenario, a remote control of the cleaning device 100 can be realized using the smart control device 10 without limiting a physical distance between the two devices.

In some embodiments, when the cleaning device 100 performs a cleaning operation, the smart control device 10 can acquire a geographical location of the user and send the geographical location to the cleaning device 100. The cleaning device 100 can then further perform a cleaning task according to the geographical location of the user and a user-defined or predetermined cleaning mode.

Figure 2:
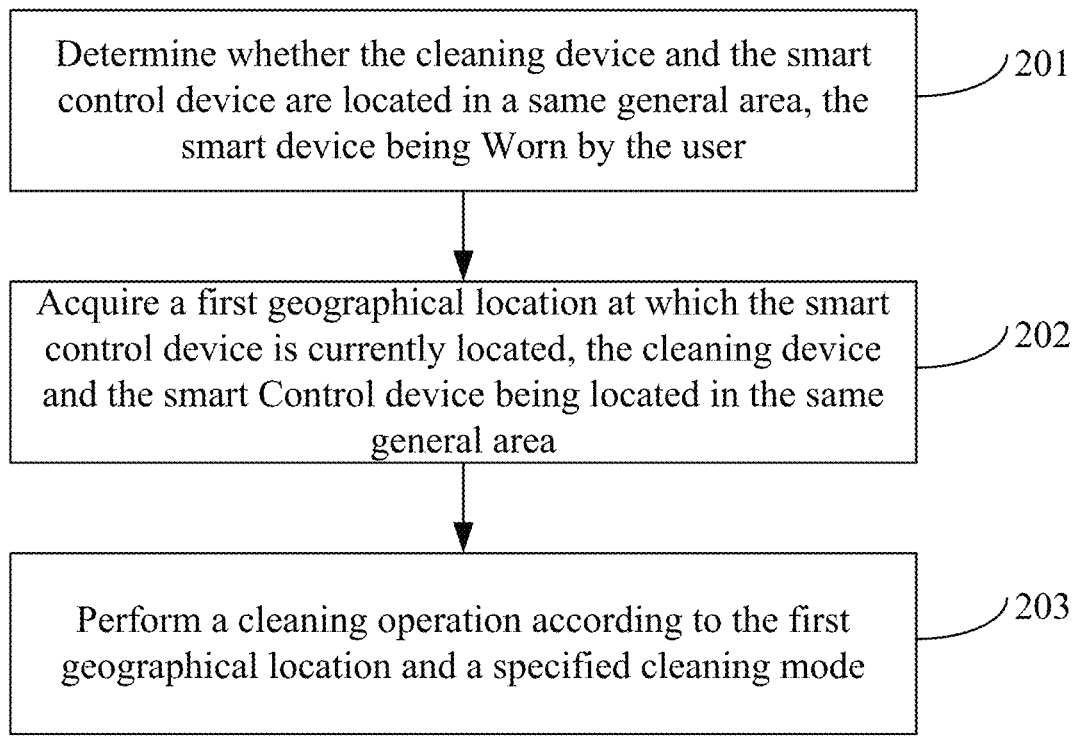
FIG. 2 is a flowchart illustrating a method for performing a cleaning operation with a cleaning device according to some embodiments.

FIG. 2 is a flowchart illustrating a method for performing a cleaning operation with a cleaning device, according to some embodiments. As shown in FIG. 2, the method can be applied to the cleaning device 100 and include the following steps.

In Step 201, it is determined whether the cleaning device 100 and the smart control device 10 are located within a communication range, such as a WiFi range or a Bluetooth range. In some embodiments, the smart control device 10 is worn by a user, such as on a wrist of the user.

In Step 202, in the case that the cleaning device 100 and the smart control device 10 are located in the local range, such as within the same house, a first geographical location of the smart control device 10, where the smart control device 10 is currently located, is acquired.

In Step 203, a cleaning operation is performed according to the first geographical location and a specified cleaning mode.

According to the method provided by some embodiments of the present disclosure, prior to the cleaning device 100 performing the cleaning operation, first it is determined whether the cleaning device 100 and its previously-associated smart control device 10 are located within a local range, such as within the same house. The smart control device 10 can be a handheld device or a wearable device, for example, of the user located in the same house.

If the cleaning device 100 and the smart control device 10 are currently located in the same local area, such as within the same house, the cleaning device 100 may acquire the first geographical location of the smart control device 10 and perform the cleaning operation according to the first geographical location and the specified cleaning mode.

Therefore, more cleaning modes can be realized in a variety or diversified manners. For example, according to some embodiments, the user location can be obtained based on the location of the smart control device 10, and a smarter cleaning operation mode can be achieved targeting the user location. Of course, the user location can be hidden and the user positioning function can be selected to be "off," to protect the user's privacy, if so desired.

In some embodiments, the action of performing the cleaning operation based on the first geographical location and the specified cleaning mode can include the following actions.

For example, if the specified cleaning mode is a first cleaning mode, a first geographical area in which the smart control device 10 is currently located is determined according to the first geographical location.

The cleaning device 100 can then be controlled to perform the cleaning operation in a region other than the first geographical region.

This first cleaning mode can be referred to area-avoidance cleaning, in which the cleaning device 100 performs the cleaning operation in one or more regions other than the first geographical region. This mode is particularly useful, for example, when the user does not wish to be disturbed by the cleaning while the user is at the first geographical location in the first geographical area, and the cleaning device 100 will automatically avoid the first geographical area to thereby not to disturb the user.

In some embodiments, the method can further include the following steps.

An area map of a current location of the cleaning device is acquired. In some embodiments, in the case that the cleaning device 100 is configured to clean only the floor, the map can be a 2D or planar map. In some other embodiments, in the case that the cleaning device 100 is also capable of climbing up or down in addition to move horizontally, the map can be a 3D map.

Spatial boundaries of one or more geographical areas at the current location of the cleaning device can be determined according to the area map. For example, the one or more geographical areas of the current location can be determined by determining specified geometrical parameters, such as distance, coordinates, shapes, area sizes, etc., in the area map.

Corresponding relationships between the geographical areas and the spatial boundaries and/or the geometrical parameters can be stored, for example, on a computer-readable medium, on the start control device 10, on the cleaning device 100, or on a cloud, etc.

The step of determining the first geographical area in which the smart control device is currently located according to the first geographical location can include the following sub steps.

For example, it is first determined whether the first geographical location is in one of the geographical areas in the corresponding relationships.

If the first geographical location is in one of the geographical areas, a geographical area corresponding having the spatial boundaries enclosing the geographical area is determined as the first geographical area.

In some embodiments, the step of performing the cleaning operation according to the first geographical location and the specified cleaning mode can include the following sub steps.

For example, if the specified cleaning mode is a second cleaning mode, a sub step of determining whether a distance between the first geographical location and a second geographical location at which the cleaning device is currently located is not smaller than a predetermined threshold value.

If the distance between the first geographical location and the second geographical location is not smaller than the preset threshold value, then the cleaning operation is performed according to a movement trajectory of the smart control device 10.

This second cleaning mode is tracking-type cleaning in which the distance between the cleaning device and the smart control device is not smaller than the preset threshold value. This cleaning mode may be particularly useful for example, when the user carries or wears the smart control device 10 from the second geographical location to the first geographical location along the movement trajectory (such as that the user finds spots that need to be cleaned), the cleaning device 100 will follow the desired trajectory to clean the desired spots along the trajectory. Meanwhile, if the user is within the distance less than the predetermined threshold value from the cleaning device 100, for example when doing errands in the same area, the cleaning device 100 does not follow the user around.

In some embodiments, the step of performing the cleaning operation according to the movement trajectory of the smart control device 10 can include the following sub steps.

For example, the movement trajectory of the smart control device 10 is first acquired.

A current distance between the cleaning device 100 and the smart control device is acquired in real time during the cleaning operation according to the movement trajectory.

If the current distance between the cleaning device 100 and the smart control device 10 is smaller than the preset threshold value, then the cleaning device 100 automatically moves farther away from the smart control device 10, until the current distance between the cleaning device 100 and the smart control device 10 reaches again at least the predetermined threshold value. The cleaning device 100 then continues to perform the cleaning operation according to the movement trajectory. As such, the user will not feel bothered by the cleaning device 100 following too closely.

In some embodiments, the step of performing the cleaning operation according to the first geographical location and the specified cleaning mode can include the following sub steps.

For example, it is determined, in the case that the specified cleaning mode is the second cleaning mode, whether the distance between the first geographical location and the second geographical location at which the cleaning device is currently located is not smaller than the predetermined threshold value.

If the distance between the first geographical location and the second geographical location is indeed not smaller than the predetermined threshold value, the first geographical area in which the smart control device 10 is currently located is determined according to the first geographical location.

The cleaning operation is then performed for the first geographical area.

In some embodiments, the step of performing the cleaning operation in the first geographical area can include the following sub steps.

For example, a current distance between the cleaning device 100 and the smart control device 10 is acquired in real time during cleaning the first geographical area.

If the current distance between the cleaning device 100 and the smart control device is smaller than the preset threshold value, the cleaning device can move gradually farther away from the smart control device 10 until the current distance between the cleaning device and the smart control device 10 is at least the predetermined threshold value, and continue to perform the cleaning operation in the first geographical area.

In some embodiments, the step of performing the cleaning operation according to the first geographical location and the specified cleaning mode can include the following sub steps.

First, the first geographical area in which the smart control device 10 is currently located is determined according to the first geographical location.

Next, a specified staying duration of the user in the first geographical area is determined.

Further, a specified cleaning strength grade matching the specified staying duration is acquired according to predetermined corresponding relationships between staying durations and cleaning strength grades.

The cleaning operation can then be performed according to the specified cleaning strength grade and the specified cleaning mode. For example, if the user stays in an area longer, the cleaning device 100 can automatically perform deeper cleaning at a higher cleaning strength grade accordingly.

The above embodiments can combined into optional modes/embodiments in a number of different ways.

Figure 3:
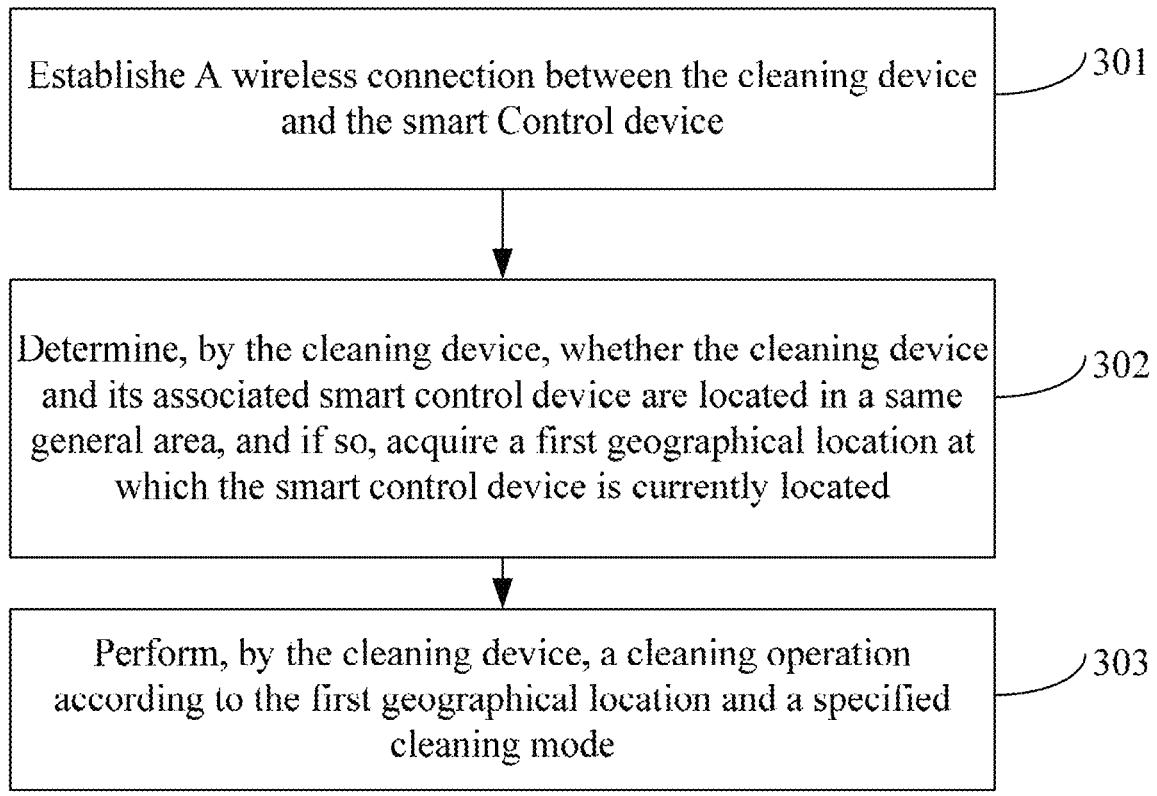
FIG. 3 is a flowchart illustrating a method for performing a cleaning operation with a cleaning device according to some embodiments.

FIG. 3 is a flowchart illustrating a method of performing a cleaning operation with a cleaning device 100 according to some embodiments. As shown in FIG. 3, the method can employ the cleaning device 100 and include the following steps.

In Step 301, the cleaning device 100 establishes a wireless connection with the smart control device 10.

The smart control device 10 can be located on or about a user, such as being worn on a limb part of the user or held in a hand by the user. Smart wearable devices are usually worn on the arm or wrist of the user, and may include for example, a smart bracelet or a smart watch.

A smart mobile phone can be held in the hand by the user. In some embodiments of the present disclosure, if the smart control device 10 is a smart mobile phone, the smart mobile phone can be configured to determine whether the user is currently using the smart mobile phone based on whether the user performs one or more specified operations on the smart mobile phone.

If the smart control device 10 is a smart bracelet, a smart watch or the like, it can be determined whether the user is currently wearing the smart bracelet or the smart watch based on whether real-time data of the user can be acquired. For example, for a smart bracelet, when a heartbeat of the user is currently be detected, it can be determined that the user is currently wearing the smart bracelet.

In some embodiments of the present disclosure, the cleaning device 100 and the smart control device 10 can perform data transmission once the wireless connection 12 is established between the cleaning device 100 and the smart control device 10. The wireless connection may be a Bluetooth connection, a WiFi connection, a network data connection, or other types of connections.

The user may further establish a binding relationship between the smart control device 10 and the cleaning device 100 in advance, and the binding relationship can be stored on the smart control device 10, the cleaning device 100, or in a cloud. As such, a subsequent step may be triggered only after the smart control device 10 associated with the cleaning device establishes the wireless connection with the cleaning device.

In Step 302, the cleaning device determines whether the cleaning device 100 and the smart control device 10 are located in a same area, and if the cleaning device 100 and the smart control device 10 are indeed located in the same area, a first geographical location at which the smart control device 10 is currently located can be acquired.

Whether the cleaning device 100 and the smart control device 10 are located in the same area may be determined in, but not limited to, the following manners.

(A) In the case of a Bluetooth connection with a distance limitation, for example, a maximum communication distance of the Bluetooth connection may be smaller than 100 meters. When the Bluetooth connection is established between the cleaning device 100 and the smart control device 10, it can be determined that the cleaning device 100 and the smart control device 10 are located in a same area, for example within 100 meters.

(B) In the case of a WiFi connection with a distance limitation, when the cleaning device 100 and the smart control device 10 are connected to a same access point, i.e., when the two devices are simultaneously connected to the same WiFi network or account, it can be determined that the cleaning device 100 and the smart control device 10 are located in a same area.

(C) In the case of the network data connection, which may be a 4th Generation (4G) mobile communication connection, communication portions (e.g., communication modules, circuits, blocks, or functions) are arranged in both of the cleaning device 100 and the smart control device 10 for network data connection with other devices.

In some embodiments, a distance between the cleaning device 100 and the smart control device 10 may be determined by satellite positioning, for example, Global Positioning System (GPS) positioning. When the distance between the two devices is smaller than a specific threshold value, it can be determined that the cleaning device 100 and the smart control device 10 are located in the same area. In some embodiments, the distance between the cleaning device 100 and the smart control device 10 may be determined with wireless signal triangulation, signal strength, orientation, or polarization, local access points, passive or active infrared (IR) or ultrasound scanning, etc.

In some embodiments, the specific threshold value may be 50 meters, 100 meters, etc., and will not be specifically limited in the embodiments of the present disclosure. In some embodiments, the specific threshold value may be set by the user, or autonomously determined based on the user data such as user habits.

In some embodiments, the smart control device 10 is worn by the user such as on a limb part of the user, a current location of the user can therefore be obtained once the location of the smart control device 10 is obtained. In some embodiments of the present disclosure, the smart control device 10 can obtain its own first geographical location and its own movement trajectory (e.g., trajectory of the user wearing or holding the smart control device 10). Such an operation of obtaining the locations can be performed periodically or in real time, for example based on GPS positioning or other positioning approaches described above, and the obtained locations can be automatically reported to the cleaning device 100 periodically or in real time.

Thereafter, the cleaning device 100 can automatically perform a related cleaning task according to the geographical location information after receiving the geographical location information, as reported by the smart control device 10.

In Step 303, the cleaning device 100 performs a cleaning operation according to the first geographical location and a specified cleaning mode.

In some embodiments, according to different cleaning modes, the cleaning device 100 can perform, but not limited to, the following cleaning operations after obtaining the first geographical location of the user.

For example, in a first situation or a first cleaning mode, the cleaning device 100 and the smart control device 10 are located in different geographical areas. The first cleaning mode can be the avoidance-type cleaning in which the cleaning device 100 performs the cleaning operation in an area other than a first geographical area in which the smart control device 10 is currently located.

In such a case, because the specified cleaning mode predetermined by the user is the user-avoidance cleaning mode, the cleaning device 100 may further need to determine the first geographical area in which the smart control device 10 (e.g., the user) is currently located according to the first geographical location, after receiving the real-time geographical location sent by the smart control device 10. The cleaning device 100 can then perform the cleaning operation in an area other than the first geographical area.

Figure 4:
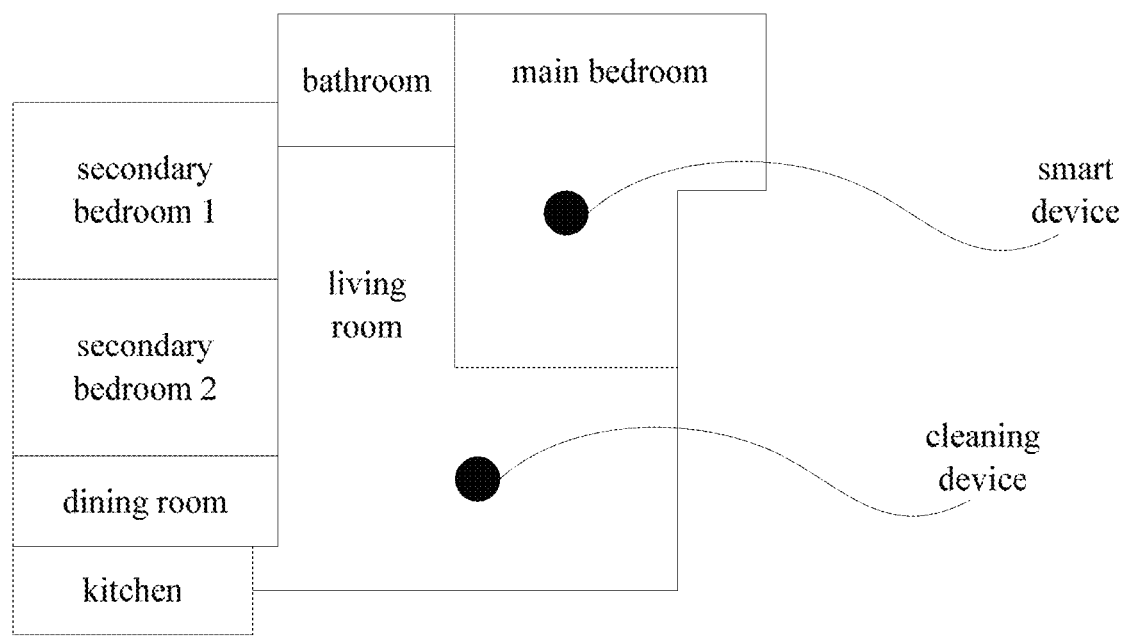
FIG. 4 is an illustrative floor plan for using the cleaning device according to some embodiments.

Referring to FIG. 4, for example, for the floor plan as shown of a house or an apartment, geographical areas may include a living room, a main (master) bedroom, a secondary bedroom 1, a secondary bedroom 2, a dining room, a bathroom, a kitchen, etc. When the user is currently located in the main bedroom, the cleaning device 100 can automatically avoid the main bedroom, and preferably perform the cleaning tasks in the areas other than the first geographical area (the main bedroom). Therefore, the user will not be disturbed by the cleaning device.

On the other hand, according to some embodiments, when the user leaves the main bedroom, the cleaning device 100 can enter the main bedroom to perform the cleaning operation autonomously.

In some embodiments, after a quick determining of the geographical area in which the user is currently located after the current real-time geographical location of the user is acquired, the method according to some embodiments of the present disclosure can further include the following steps. First, a map of the house or apartment in which the cleaning device 100 is currently located is acquired, as illustrated in FIG. 4 for an example. Then, spatial boundaries of one or more geographical areas included in the floor plan can be determined, and corresponding relationships between the geographical areas and the spatial boundaries/coordinates are stored.

Therefore, when the cleaning device 100 determines the first geographical area in which the smart control device 10 is currently located according to the first geographical location, the main bedroom shown as an example in FIG. 4, the following steps may be implemented. First, it is determined whether the first geographical location is in one of the areas in the correspondence relationships between the geographical areas and the spatial boundaries/coordinates. If the first geographical location is in one of the spatial boundaries, a geographical area corresponding to the spatial boundaries is determined as the first geographical area.

For example, in the case that the smart control device 10 is determined to be the first geographical location having a first set of coordinates, the first set of coordinates are compared with the stored map of the floor plan as illustrated in FIG. 4. The first geographical location (first set of coordinates) are determined to be within the spatial boundaries of the main bedroom, and then the corresponding geographical area (the main bedroom) is determined as the first geographical area.

In a second case or a second cleaning mode, the cleaning device 100 performs tracking-type cleaning, in which a distance between the cleaning device 100 and the smart control device 10 is not smaller than a preset threshold value.

For example, the predetermined threshold value may be 1 meter, 2 meters, 5 meters, 10 meters, etc., which can be user defined, automatically determined based on the user data/habits, etc., and are not limiting. The distance not smaller than the preset threshold value may be may be referred to as a safety distance, a no-disturbance radius, a quiet zone, etc., and is arranged to avoid a collision between the user and the cleaning device 100 or avoid the user feeling disturbed by the cleaning device 100.

In such a specified cleaning mode, for example, preset by the user to be user-tracking cleaning, the cleaning device 100 determines whether a distance between the first geographical location and a second geographical location at which the cleaning device is currently located is not smaller than the preset threshold value, after receiving the real-time location sent by the smart control device 10. If the distance between the first geographical location and the second geographical location is not smaller than the preset threshold value, the cleaning device 100 may perform the cleaning operation according to the movement trajectory of the smart control device 10.

In some embodiments, the operation of performing the cleaning operation according to the movement trajectory of the smart control device 10 may be implemented in a manner such that the movement trajectory of the user is recorded through the smart control device 10. The smart control device 10 further sends the movement trajectory to the cleaning device 100, and then the cleaning device 100 may clean a region in which the user walks or stays according to the movement trajectory after acquiring the movement trajectory. For example, only places in which the user has been are cleaned.

In some embodiments, the tracking-type cleaning during which the distance is not smaller than the preset threshold value can have different implementations. For example, in a first implementation, the cleaning device 100 is kept at a minimum distance away from the user all the time. Such a minimum distance can be predetermined, for example, 1 meter, 2 meters, 5 meters, etc. In some other embodiments, such a minimum distance can be automatically determined based on user data or user habits, and can be a variable value depending on the time, location, user, dust detection, etc.

In a second implementation, the distance between the cleaning device 100 and the user is larger than the preset threshold value, and the distance between them is not necessarily a fixed value. Rather, the distance between them is only required to be kept larger than the preset threshold value. For example, the distance between them is only required to be larger than 2 meters according to some embodiments.

In some embodiments, if the distance between the first geographical location and the second geographical location is smaller than the preset threshold value, for avoiding the collision between the cleaning device 100 and the user, a distance currently between the cleaning device 100 and the smart control device 10 may be acquired in real time during the cleaning operation performed by the cleaning device 100 according to the movement trajectory of the smart control device 10.

If the distance currently between the cleaning device 100 and the smart control device 10 is smaller than the preset threshold value, then the cleaning device 100 moves gradually farther away from the smart control device 10 until the current distance between the cleaning device 100 and the smart control device 10 is at least the preset threshold value. The cleaning device 100 may continue to perform the cleaning action according to the acquired movement trajectory.

In some embodiments, the cleaning device 100 moving gradually farther away from the smart control device 10 is controlled by a controller, a processing circuit, or software instructions on the cleaning device 100. In some other embodiments, the control function is implemented on the smart control device 10, on another smart home device/controller, shared between the cleaning device 100 and the smart control device 10, or in the cloud.

For the cleaning device 100 to be controlled to move farther away from the smart control device 10, the following implementations may be adopted. For example, the cleaning device 100 can be controlled to adjust a movement direction, such as adjusting into an opposite direction of a current forward movement direction. Subsequently, the cleaning device 100 is controlled to move forward until moving to a location at a distance of not smaller than the preset threshold value away from the geographical location at which the smart control device 10 is currently located. The cleaning device 100 can then continue to perform the cleaning operation from this location.

In some embodiments, in the above the cleaning operation, cleaning may be performed according to the movement trajectory of the smart control device 10, and the whole geographical area in which the user is currently located may also be cleaned.

For example, the embodiments of the present disclosure can further include the following actions. If the specified cleaning mode set by the user is the second cleaning mode, when the distance between the first geographical location and the second geographical location is not smaller than the preset threshold value, the first geographical area in which the smart control device 10 is currently located may further be determined according to the first geographical location. The cleaning operation can then be further performed on the first geographical area while ensuring the distance between the cleaning device and the user to be not smaller than the preset threshold value.

In an example, when the user is currently located in the living room, the areas other than the area in which the user walks or stays are also cleaned on the premise of ensuring that the distance with the user is not smaller than 2 meters.

In some embodiments, during the cleaning operation performed by the cleaning device 100 on the first geographical area, the current distance between the cleaning device 100 and the smart control device 10 may further be acquired in real time. If the acquired current distance between the cleaning device 100 and the smart control device 10 is smaller than the preset threshold value, to avoid collisions between the cleaning device 100 and the user, the cleaning device 100 may also be controlled to move gradually farther away from the smart control device 10 until the current distance between the cleaning device 100 and the smart control device 10 is at least the preset threshold value, and the cleaning device 100 can be controlled to start continuing to perform the cleaning operation in the first geographical area from that location.

In some embodiments, to ensure the cleaning strength, a corresponding relationship between a staying duration and a cleaning strength grade is predetermined. For example, the cleaning strength of the cleaning device 100 is higher in a place with a longer staying duration of the user. The cleaning device 100 may locally store such a corresponding relationship between the cleaning strength grade and the staying duration, shown in Table 1 as an example.

TABLE 1

| Duration of stay | Cleaning strength grade |
|---|---|
| 1-60 min | Light cleaning |
| >60 min | Deep cleaning |
| . . . | . . . |

In some embodiments, compared with the light cleaning, the deep cleaning involves a higher rotating frequency of a cleaning brush, a longer cleaning time, and/or a larger number of back-and-forth cleaning movements. Of course, cleaning strength grades may also be divided into more detailed levels, which will not be specifically limited in the embodiments of the present disclosure.

In some embodiments, when the cleaning operation is performed according to the first geographical location and the specified cleaning mode, the following implementations may be adopted. For example, the first geographical area in which the smart control device 10 is currently located is determined according to the first geographical location. A specified duration of stay of the user in the first geographical area is also determined, for example based on the duration of stay of the smart control device 10. A specified cleaning strength grade matching with the specified staying duration is acquired according to the preset corresponding relationships between the durations of stay and the cleaning strength grades. The cleaning operation is then performed according to the specified cleaning strength grade and the specified cleaning mode.

In some embodiments, regardless of the specific cleaning modes adopted to perform the cleaning operation by the cleaning device 100, the cleaning device 100 may perform cleaning according to a set of predetermined rules or logics. For example, when cleaning is performed according to the first cleaning mode, and if the duration of stay of the user in the main bedroom is 2 hours, the cleaning device 100 may perform deep cleaning on the whole main bedroom. In some implementations, a movement trajectory of the user staying in the main bedroom may further be acquired, and deep cleaning is performed according to the movement trajectory.

According to some embodiments, prior to the cleaning device 100 performing the cleaning operation, it may be first determined whether the cleaning device 100 and its associated smart control device 10 worn by the user are located in a same general area. If the cleaning device 100 and the smart control device 10 are indeed currently located in the same general area, the cleaning device 100 may acquire the first geographical location of the smart control device 10 and perform the cleaning operation according to the first geographical location and the specified cleaning mode. Therefore, cleaning implementations are extended, and the cleaning approaches are more diversified. Furthermore, the user is located based on the location of the smart control device 10, such cleaning operation is better targeted, and smarter cleaning operations can be realized.

Figure 5:
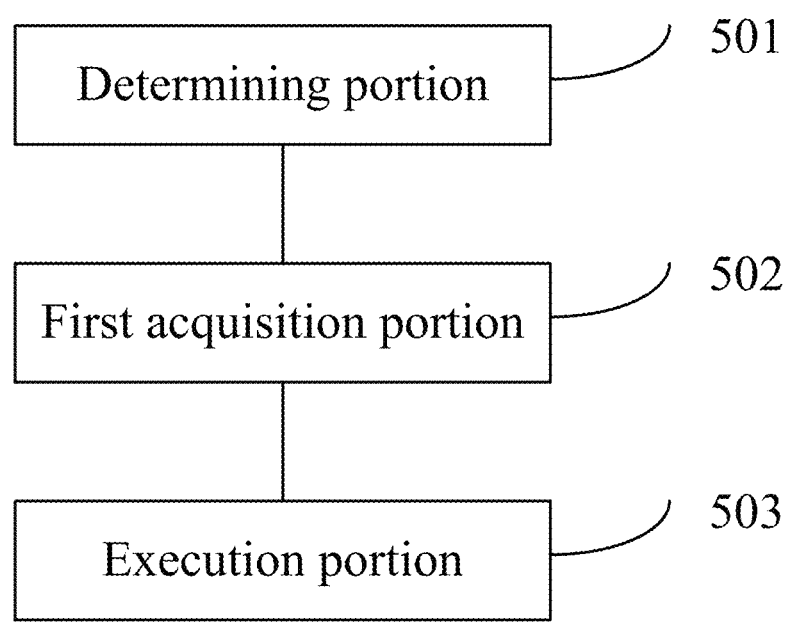
FIG. 5 is a block diagram of an apparatus for performing a cleaning operation according to some embodiments.

FIG. 5 is a block diagram of a device for performing a cleaning operation according to some embodiments. Referring to FIG. 5, the device includes a determining portion 501, a first acquisition portion 502 and an execution portion 503.

The determining portion 501 is configured to determine whether the cleaning device 100 and a smart control device 10 are located in the same general area, and/or whether the smart control device 10 is being worn by a user. For example, if the smart control device 10 is being worn by the user on a wrist, the existence of measured pulses and/or body temperature of the user can be transmitted to the determining portion 501, which then determines that the smart control device 10 is indeed being worn by a user.

Other physical or movement parameters of the user may also be measured by the smart control device 10, to help determining the cleaning operations of the cleaning device. In some embodiments, with the user's permission or agreement, the smart control device 10 can also collect other user data, such as user habits, schedule, preferences, etc., to facilitate building a user profile, based on which autonomous cleaning operations can be performed. In some embodiments, the user data can be transferred from other media instead of being collected by the smart control device. 10. Of course, the user can opt out of data collection and transfer, to protect the user privacy. In some embodiments, a user identification can be generated corresponding to the user profile. The user identification can be selected to such that it does not reveal the user's real identity, to thereby protect the user privacy.

The first acquisition portion 502 is configured to, when the cleaning device and the smart control device 10 are located in the same scenario, acquire a first geographical location at which the smart control device 10 is currently located.

The execution portion 503 is arranged to perform a cleaning operation according to the first geographical location and a specified cleaning mode.

In some embodiments, the execution portion 503 is configured to, when the specified cleaning mode is a first cleaning mode, determine a first geographical area in which the smart control device 10 is currently located according to the first geographical location, and control the cleaning device 100 to perform the cleaning operation in one or more areas other than the first geographical area.

The first cleaning mode is the avoidance-type cleaning, during which the cleaning device 100 performs the cleaning operation in one or more areas other than the first geographical area.

The various portions 501, 502, 503 according to some embodiments can be implemented in modular configurations and can sometimes be referred to as modules or units. In some other embodiments, the various portions can be realized with non-modular components. In some embodiments, the various portions can be realized with software instructions executable by one or more processing circuits.

Figure 6:
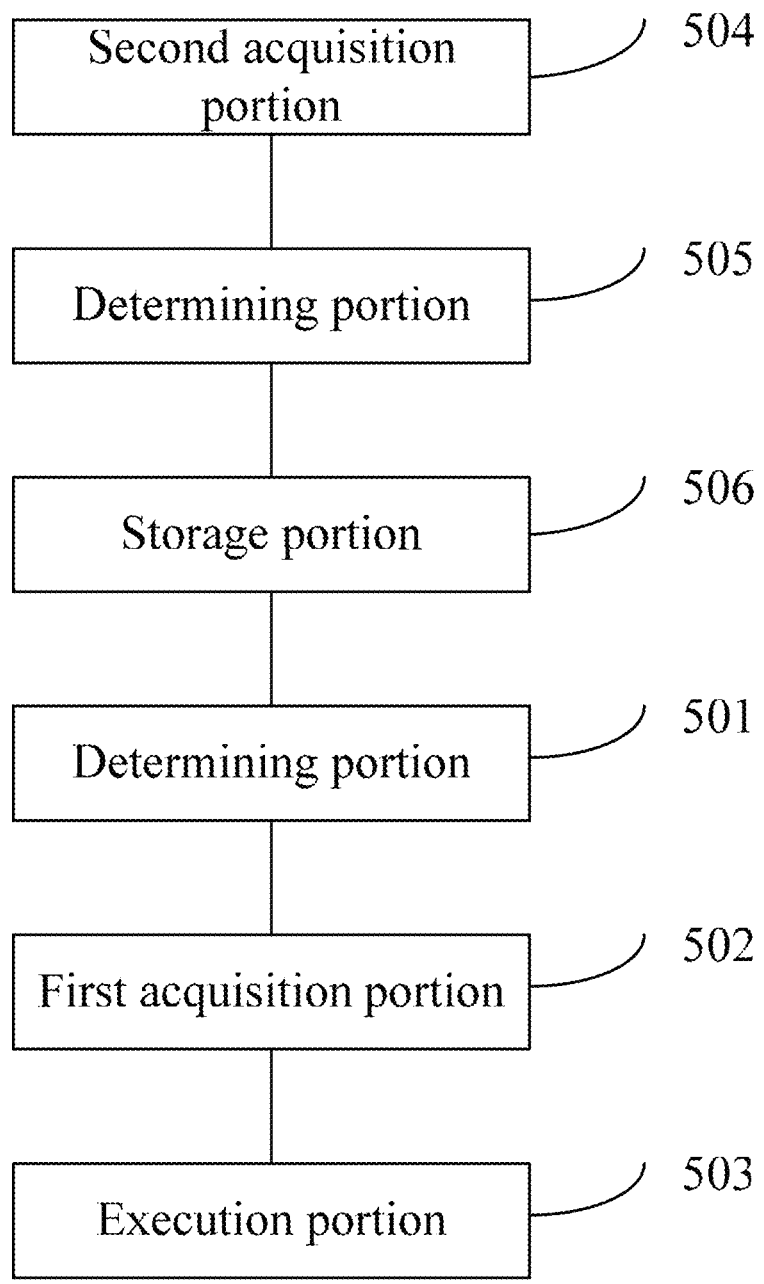
FIG. 6 is a block diagram of an apparatus for performing a cleaning operation according to some embodiments.
Figure 7:
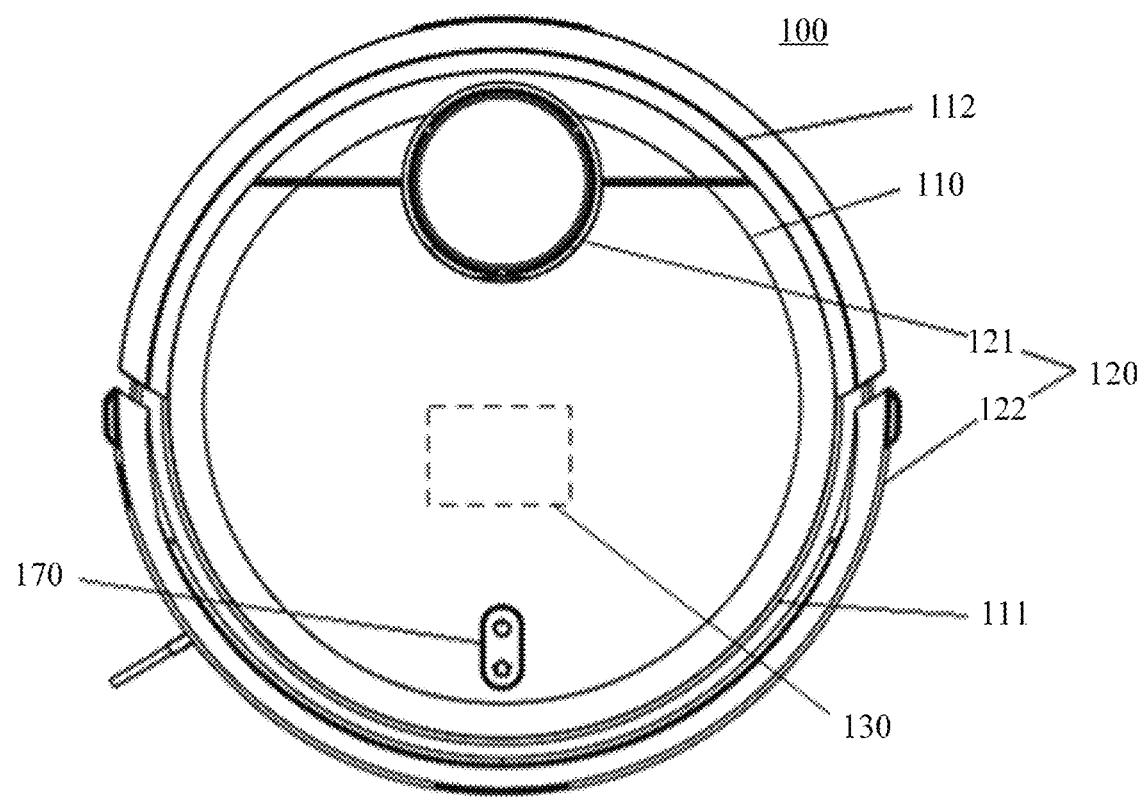
FIG. 7 is a block diagram of a cleaning device according to some embodiments.
Figure 8:
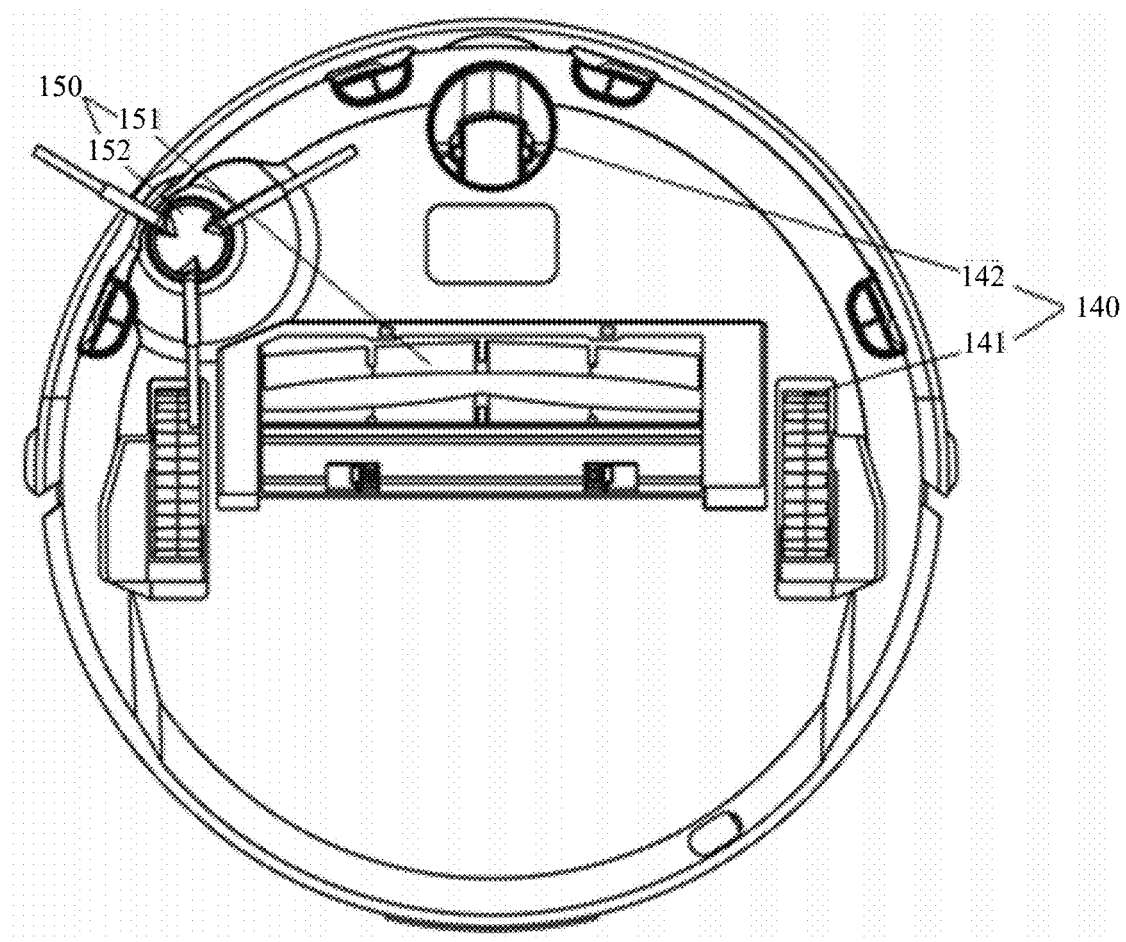
FIG. 8 is a block diagram of a cleaning device according to some embodiments.
Figure 9:
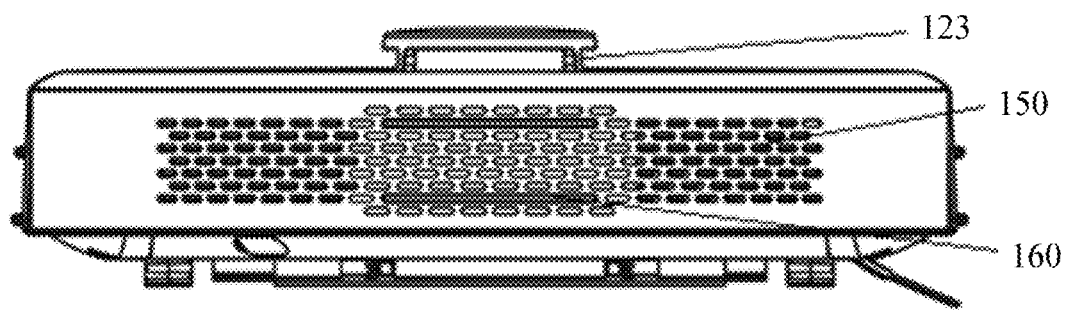
FIG. 9 is a block diagram of a cleaning device according to some embodiments.
Figure 10:
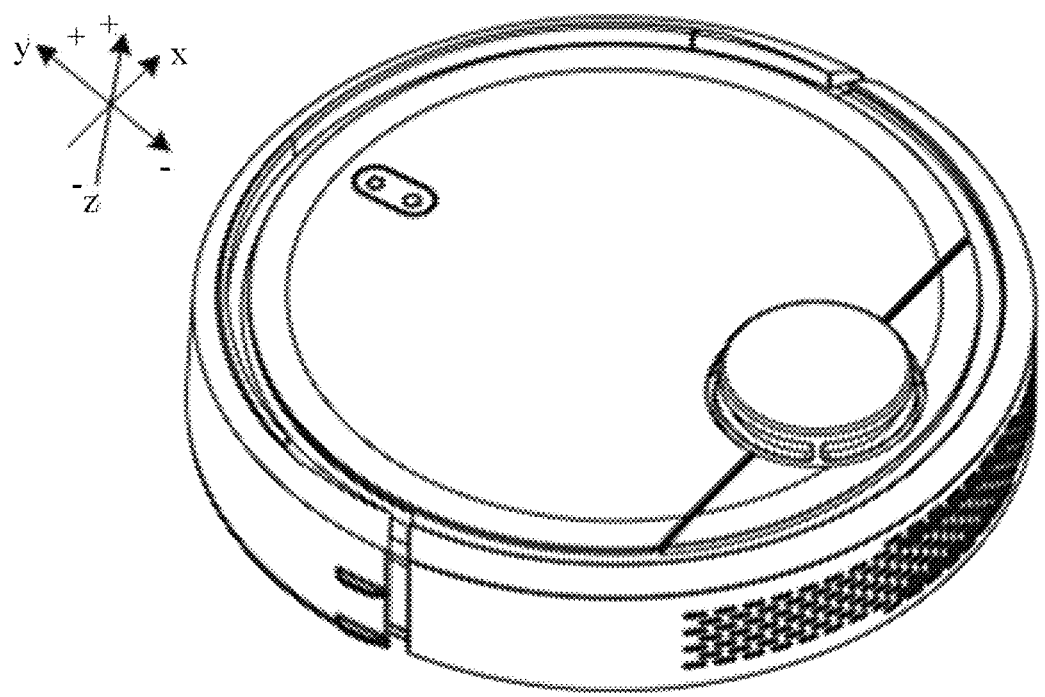
FIG. 10 is a block diagram of a cleaning device according to some embodiments.

In some embodiments, as illustrated in FIG. 6, the device can include a second acquisition portion 504, a determining portion 505, and a storage portion 506.

The second acquisition portion 504 is configured to acquire a map of the general area, such as a house, an apartment, an office space, etc., in which the cleaning device is currently located.

The determining portion 505 is configured to determine spatial ranges or boundaries of one or more geographical areas included in the general area in which the cleaning device is currently located according to the map.

The storage portion 506 is configured to store corresponding relationships between the geographical areas and the spatial ranges or boundaries.

The determining portion 505 can be further configured to determine whether the first geographical location is in one of the space ranges in the corresponding relationships, and if the first geographical location is in one of the spatial ranges, determine a geographical area corresponding to the spatial as the first geographical area.

In some embodiments, the execution portion 503 can be arranged to, of the specified cleaning mode is the second cleaning mode, determine whether a distance between the first geographical location and a second geographical location at which the cleaning device 100 is currently located is not smaller than a preset threshold value. If the distance between the first geographical location and the second geographical location is indeed not smaller than the preset threshold value, perform the cleaning operation according to a movement trajectory of the smart control device 10.

The second cleaning mode is the tracking-type cleaning, during which the distance between the cleaning device 100 and the smart control device 10 is not smaller than the preset threshold value.

In some embodiments, the execution portion 503 is configured to acquire the movement trajectory of the smart control device 10 and acquire a distance currently between the cleaning device and the smart control device 10 in real time during the cleaning operation performed according to the movement trajectory. If the distance currently between the cleaning device 100 and the smart control device 10 is smaller than the preset threshold value, the execution portion 503 controls the cleaning device 100 to move gradually farther away from the smart control device 10, until the distance currently between the cleaning device 100 and the smart control device 10 is at least the preset threshold value, and continue to perform the cleaning operation according to the movement trajectory.

In some embodiments, the execution portion 503 is configured to, when the specified cleaning mode is the second cleaning mode, determine whether the distance between the first geographical location and the second geographical location at which the cleaning device 100 is currently located is not smaller than the preset threshold value. If the distance between the first geographical location and the second geographical location is not smaller than the preset threshold value, the execution portion 503 determines the first geographical area in which the smart control device 10 is currently located according to the first geographical location and perform the cleaning operation in the first geographical area.

In some embodiments, the execution portion 503 is configured to acquire the distance currently between the cleaning device 100 and the smart control device 10 in real time during cleaning the first geographical area. When the distance currently between the cleaning device 100 and the smart control device 10 is smaller than the preset threshold value, the execution portion 503 controls the cleaning device 100 to move gradually farther away from the smart control device 10 until the distance currently between the cleaning device and the smart control device 10 is at least the preset threshold value, and continue to perform the cleaning operation in the first geographical area.

In some embodiments, the execution portion 503 is configured to determine the first geographical area in which the smart control device 10 is currently located according to the first geographical location, determine a specified duration of stay of the user in the first geographical area, acquire a specified cleaning strength grade matching with the specified duration of stay according to preset corresponding relationships between staying durations and cleaning strength grades, and perform the cleaning operation according to the specified cleaning strength grade and the specified cleaning mode.

Prior to the cleaning operation, it may be first determined whether the cleaning device 100 and its associated smart control device 10, which may be worn by the user, are located in a same general area. If the cleaning device 100 and the smart control device 10 are currently located in the same general area, the cleaning device 100 may acquire the first geographical location of the smart control device 10 and perform the cleaning operation according to the first geographical location and the specified cleaning mode. Therefore, cleaning implementations are extended, and the cleaning approaches are more diversified. Furthermore, the user is located based on the location of the smart control device 10, such a cleaning operation is better targeted, and smarter cleaning operations can be realized.

FIGS. 7-10 are structure diagrams illustrating a cleaning device 100 according to an exemplary embodiment. The cleaning device 100 may include a main body 110, a sensing system 120, a control system 130, a driving system 140, a cleaning system 150, an energy source system 160, and a human-computer interaction system 170. The main body 110 includes a forward portion 111 and a backward portion 112 and has an approximately round shape with both a substantially round front and a substantially round back. In some other embodiments, the cleaning device 100 can have other shapes, including, but not limited to, an approximately D shape with a square front and a round back, a square shape, an elongated shape, etc.

The sensing system 120 can include a location determination device 121 located over the main body 110, a buffer 122 located at the forward portion 111 of the main body 110, a cliff sensor 123, and a sensing device (not shown) such as an ultrasonic sensor, an infrared sensor, a magnetometer, an accelerometer, a gyroscope, an odometer, etc. Such sensors can provide various types of location information and motion state information of the cleaning device 100 for the control system 130. The location determination device 121 can include, but not limited to, a camera, a Laser Distance Sensor (LDS), etc.

The forward portion 111 of the main body 110 can carry the buffer 122, and when a driving wheel portion 141 drives the robotic cleaning device 100 to move on the ground in a cleaning process, the buffer 122 detects one or more events (or objects) in a walking path of the cleaning device 100 through the sensing system such as through the infrared sensor, and the robotic cleaning device 100 may control the driving wheel portion 141 to enable the cleaning device 100 to respond to the events (or objects). For example, the cleaning device 100 can automatically move away from obstacles such as a wall or a piece of furniture, or stop or move backwards automatically when a human or pet moves into the path of the cleaning device 100.

The control system 130 can be arranged on a circuit board in the main body 110, and can include a non-transitory computer-readable medium such as memory, a hard disk, a flash memory, or a random-access memory (RAM). The control system 130 can also include a processing circuit, such as a processor, for communications, logic controls, computing, etc. The processor can include, for example, a central processing unit (CPU), and/or an application processor.

The application processor can draw an instant map of an environment in which the robotic cleaning device 100, for example, using a location algorithm such as a Simultaneous Location and Mapping (SLAM) algorithm. The instant map can include obstacle information fed back by the LDS.

Moreover, a current working status of the cleaning device 100 can be determined. Such a status may include, for example, crossing a doorsill, moving onto a carpet, located on a cliff, the upper portion or the lower portion being clamped, a dust bin is full, the cleaning device being brought up by hand, etc. Such a status can be comprehensively determined in combination with distance information and speed information fed back by the buffer 122, the cliff sensor 123, and the sensing device such as the ultrasonic sensor, the infrared sensor, the magnetometer, the accelerometer, the gyroscope, and/or the odometer.

Based on the determined status, a subsequent specific action strategy may also be made for different conditions. Therefore, the cleaning device 100 can act based on need of the user, and a better user experience can be realized. Furthermore, the control system 130 can plan a most efficient and reasonable cleaning path and cleaning manner based on the information about the instant map drawn by SLAM, such that cleaning efficiency is greatly improved.

The driving system 140 can control the cleaning device 100 to move over the ground with driving commands including distance and angle information. For example, the driving commands may include horizontal moving distance components x, y, and turning angle component θ.

The driving system 140 can include the driving wheel portion 141, and the driving wheel portion 141 can simultaneously control a left wheel and a right wheel. For controlling movement of the cleaning device 100 more accurately, the driving wheel portion 141 can include a left driving wheel portion and a right driving wheel portion, respectively.

The left and right driving wheel portions can be oppositely arranged along a lateral axis defined by the main body 110.

To facilitate the cleaning device moving more stably on the ground or with a higher movement capability, the cleaning device may include one or more wheels 142 such as slave wheels, and the wheels 142 can include, but not limited to, universal-direction wheels.

The driving wheel portion 141 can include a traveling wheel, a driving motor, and a control circuit configured to control the driving motor. The driving wheel portion 141 can further be connected to a circuit for measuring a driving current, and the odometer.

The driving wheel portion 141 can be detachably connected to the main body 110 for convenient assembling, disassembling, and maintenance. Each driving wheel can have an offset hanging-type suspension system, and be fastened in a movable manner. For example, each driving wheel can be attached to the robot body 110 in a rotating manner and receive spring offsets downward and farther away from the main body 110. The spring offsets allow the driving wheels to maintain contact and traction with the ground with certain griping forces, and meanwhile, a cleaning component of the cleaning device 100 can also contact with the ground 10 with certain pressure.

The cleaning system 150 can include at least one of a dry-cleaning system, or a wet cleaning system. A main cleaning function of the dry-cleaning system is derived from a cleaning system 151 formed by a rolling brush structure, a dust bin structure, a fan structure, an air outlet and connecting parts therebetween.

The rolling brush structure with certain interference with the ground sweeps and rolls dust on the ground to a front of a suction inlet between the rolling brush structure and the dust bin structure, and then the dust is sucked into the dust bin structure by an air flow generated by the fan structure and collected by the dust bin structure.

A dust removal capability of the cleaning device 100 may be represented by a Dust Pick up Efficiency (DPU), and the DPU is affected by the rolling brush structure and materials, a wind power utilization rate of an air duct formed by the suction inlet, the dust bin structure, the fan structure, the air outlet and connecting parts therebetween, a type and power of a fan, etc.

Compared with a conventional plugged-in vacuum machine, improving the dust removal capability is more significant for a robotic cleaning device with limited stored energy in a rechargeable battery. By improving the dust removal capability directly and effectively, the energy resource requirement can be significantly reduced. For example, a cleaning device originally capable of cleaning an area of 80 square meters after each charge may be capable of cleaning 180 square meters and even more after a charge with improved cleaning efficiency.

Moreover, service life of a battery, of which charging frequency is reduced, may also be greatly prolonged, and a battery replacement frequency by the user may also be decreased. Improving the dust removal capability is also the most obvious and important user experience, and the user may appreciate more intuitively complete or incomplete cleaning/complete or incomplete wiping.

The dry-cleaning system can further include a side brush 152 with a rotating shaft, and the rotating shaft forms a certain angle with the ground to move scraps into a rolling brush region of the cleaning system 150.

The energy source system 160 can include a rechargeable battery, for example, a nickel-metal hydride battery, a lithium battery, etc. The rechargeable battery may be connected with a charging control circuit, a battery pack charging temperature detection circuit, and a battery under-voltage monitoring circuit, and a charging control circuit. The battery pack charging temperature detection circuit and the battery under-voltage monitoring circuit can be further coupled to a processing circuit such as a single-chip microcomputer control circuit.

In some embodiments, the cleaning device 100 can be removably coupled to charging station for charging through one or more charging electrodes arranged on a side or bottom portion of the main body. In some embodiments, charging can be realized in a wireless and contactless manner.

If dust is accumulated on the exposed charging electrodes, the plastic machine body around the electrodes may be molten and deformed due to an accumulation of electrostatic charges in a charging process, even the electrode may be deformed, and normal charging cannot be continued. Accordingly, in some embodiments a self-cleaning function is implemented to remove the dust on the cleaning device 100, such as with the existing or additional brushes, with air flow, etc.

The human-computer interaction system 170 can include buttons on a host panel, and the buttons are provided for function selection by the user. In some embodiments, at least one of a display screen, an indicator light, or a loudspeaker may also be included. The display screen, the indicator light and the loudspeaker can indicate a current status or function options of the cleaning device to the user. In some embodiments, and a mobile phone client program (e.g., app) may be included. Tracking-type or path navigation cleaning mode may allow a map to be displayed showing an environment in which the cleaning device 100 and/or the smart control device 10 are located, and the locations of the devices to the user, thereby providing richer and more user-friendly function options to the user.

To describe behaviors of the cleaning device more clearly, directions are defined as follows: the cleaning device 100 may move on the ground through various combinations of movements along the following three mutually perpendicular axes defined by the main body 110: the lateral axis x, an anterior-posterior axis y, and a central vertical axis z. A forward driving direction along the anterior-posterior axis y is marked as "forward," and a backward driving direction along the anterior-posterior axis y is marked as "backward."

The lateral axis x actually extends between the right wheel and left wheel of the cleaning device along an axial center defined by a central point of the driving wheel portion 141, where the cleaning device 100 may rotate around the axis x.

The condition that the forward portion of the cleaning device 100 is upwardly-inclined and the back portion is downwardly-inclined is defined as "pitching up," and the condition that the forward portion of the cleaning device 100 is downwardly-inclined and the back portion is upwardly-inclined is defined as "pitching down."

In addition, the cleaning device 100 may rotate around the axis z. In the forward direction of the cleaning device 100, the condition that the cleaning device 100 is inclined towards a right side of the axis y is defined as "rightward rotation," and the condition that the cleaning device 100 is inclined towards a left side of the axis y is defined as "leftward rotation."

In some embodiments, a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, and the like.

When instructions stored in the storage medium are executed by a processor of the control system 130 of cleaning device 100, the cleaning device 100 can perform various cleaning operations such as those described above.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this disclosure can be implemented as operations performed by a data processing apparatus on data stored on one or more computer-readable storage devices or received from other sources.

The smart control device 10 may be a terminal or part of a terminal, which may include all kinds of apparatus, devices, and machines for processing data, including, by way of example, a programmable processor, a computer, a system on a chip, or multiple ones, or combinations of the foregoing.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the cleaning device 100 can be controlled remotely through the Internet, on a smart phone, a tablet computer or other types of computers, with a web-based graphic user interface (GUI).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented as part of a smart home design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive. In the case of a hotel or office television system, one or more robotic cleaning devices 100 can be integrally implemented in the system to clean the hotel or the office, based on tenants' location, movement, preference, habits, etc. In some embodiments, the screens are touch screens allowing user input to control the one or more cleaning devices 100.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for performing a cleaning operation with a cleaning device, the method comprising:
   determining whether the cleaning device and a terminal are located in a same general area;
   acquiring a first geographical location at which the terminal is currently located; and
   performing the cleaning operation according to the first geographical location and a specified cleaning mode,
   wherein the performing the cleaning operation according to the first geographical location and the specified cleaning mode comprises:
   determining a first geographical area in which the terminal is currently located according to the first geographical location;
   determining a duration of stay of the user in the first geographical area;
   acquiring a specified cleaning strength grade based on the duration of stay according to preset corresponding relationships between durations of stay and cleaning strength grades; and
   performing the cleaning operation according to the specified cleaning strength grade and the specified cleaning mode,
   wherein the performing the cleaning operation according to the first geographical location and the specified cleaning mode comprises:
   when the specified cleaning mode is a second cleaning mode, determining whether a distance between the first geographical location and a second geographical location at which the cleaning device is currently located is not smaller than a preset threshold value; and
   when the distance between the first geographical location and the second geographical location at which the cleaning device is currently located is not smaller than the preset threshold value, performing the cleaning operation according to a movement trajectory of the terminal,
   wherein the second cleaning mode is a tracking-type cleaning during which the distance between the cleaning device and the terminal is not smaller than the preset threshold value,
   wherein the performing the cleaning operation according to the movement trajectory of the terminal comprises:
   acquiring the movement trajectory of the terminal;
   during the cleaning operation performed according to the movement trajectory, acquiring a current distance between the cleaning device and the terminal in real time; and
   when the current distance between the cleaning device and the terminal is smaller than the preset threshold value, controlling the cleaning device to move gradually farther away from the terminal until the current distance between the cleaning device and the terminal is at least the preset threshold value, and continuing to perform the cleaning operation according to the movement trajectory.

2. The method of claim 1, wherein the performing the cleaning operation according to the first geographical location and the specified cleaning mode comprises:
   when the specified cleaning mode is a first cleaning mode, determining a first geographical area in which the terminal is currently located, according to the first geographical location; and
   controlling the cleaning device to perform the cleaning operation in one or more areas other than the first geographical area.

3. The method of claim 2, further comprising:
   acquiring a map of the general area in which the cleaning device is currently located;
   determining, based on the map, spatial boundaries of one or more geographical areas of the general area; and
   storing corresponding relationships between the geographical areas and the spatial boundaries;
   wherein the determining the first geographical area comprises:
   determining whether the first geographical location is in one set of the spatial boundaries in the corresponding relationships; and
   when the first geographical location is in one set of the spatial boundaries in the corresponding relationships, determining a geographical area corresponding to the one set of spatial boundaries as the first geographical area.

4. The method of claim 1, further comprising determining whether the terminal is being worn by the user based on one or more measured user parameters.

5. The method of claim 4, further comprising:
collecting user data;
building a user profile based on the collected user data; and
determining the specified cleaning mode based on the user profile.

6. A cleaning apparatus comprising:
a processor; and
a memory device configured to store a set of instructions executable by the processor,
wherein the processor is configured, based on the instructions, to:
determine whether the apparatus and a terminal are located in a same general area;
acquire a first geographical location at which the terminal is currently located; and
perform the cleaning operation according to the first geographical location and a specified cleaning mode,
the processor is further configured to:
when the specified cleaning mode is a second cleaning mode, determine whether a distance between the first geographical location and a second geographical location at which the apparatus is currently located is not smaller than a preset threshold value, and when the distance between the first geographical location and the second geographical location at which the apparatus is currently located is not smaller than the preset threshold value, perform the cleaning operation according to a movement trajectory of the terminal,
wherein the second cleaning mode is tracking-type cleaning in which the distance between the apparatus and the terminal is not smaller than the preset threshold value;
acquire the movement trajectory of the terminal;
acquire a current distance between the apparatus and the terminal in real time during the cleaning operation performed according to the movement trajectory; and
when the current distance between the apparatus and the terminal is smaller than the preset threshold value, control the apparatus to move gradually farther away from the terminal until the current distance between the apparatus and the terminal is at least the preset threshold value, and continue to perform the cleaning operation according to the movement trajectory.

7. The apparatus of claim 6, wherein the processor is further configured to:
when the specified cleaning mode is a first cleaning mode, determine a first geographical area in which the terminal is currently located according to the first geographical location; and
control the apparatus to perform the cleaning operation in one or more areas other than the first geographical area,
wherein the first cleaning mode is an avoidance-type cleaning during which the apparatus performs the cleaning operation in the one or more areas other than the first geographical area.

8. The apparatus of claim 7, wherein the processor is further configured to:
acquire a map of a general area in which the apparatus is currently located;
determine spatial boundaries of one or more geographical areas in the general area in which the apparatus is currently located according to the map;
store corresponding relationships between the geographical areas and the spatial boundaries; and
determine whether the first geographical location is in one set of the spatial boundaries in the corresponding relationships, and when the first geographical location is in one set of the spatial boundaries in the corresponding relationships, determine a geographical area corresponding to the one set of spatial boundaries as the first geographical area.

9. The apparatus of claim 6, further comprising:
a determining portion configured to determine whether the apparatus and the terminal are located in the same general area;
a first acquisition portion configured to obtain the first geographical location of the terminal;
an execution portion configured to determine the first geographical region in which the terminal is currently located according to the first geographical location, determine a specified staying duration of the user in the first geographical area, acquire a specified cleaning strength grade matching the specified duration of stay according to preset corresponding relationships between the durations of stay and cleaning strength grades, and perform the cleaning operation according to the specified cleaning strength grade and the specified cleaning mode;
a main body;
a sensing system including at least one of an ultrasonic sensor, an infrared sensor, a magnetometer, an accelerometer, a gyroscope, or an odometer;
a control system including the execution portion;
a driving system;
a cleaning system; and
a buffer disposed at a front portion of the main body.

10. A non-transitory computer-readable storage medium having a set of computer program instructions stored thereon, wherein the computer program instructions are executed by a processor to implement a method for performing a cleaning operation with a cleaning device, wherein the method comprises:
determining whether the cleaning device and a terminal are located in a same general area;
acquiring a first geographical location at which the terminal is currently located; and
performing the cleaning operation according to the first geographical location and a specified cleaning mode,
wherein the performing the cleaning operation according to the first geographical location and the specified cleaning mode comprises:
determining a first geographical area in which the terminal is currently located according to the first geographical location;
determining a duration of stay of the user in the first geographical area;
acquiring a specified cleaning strength grade based on the duration of stay according to preset corresponding relationships between durations of stay and cleaning strength grades; and
performing the cleaning operation according to the specified cleaning strength grade and the specified cleaning mode,
wherein the performing the cleaning operation according to the first geographical location and the specified cleaning mode comprises:
when the specified cleaning mode is a second cleaning mode, determining whether a distance between the first geographical location and a second geographical location at which the cleaning device is currently located is not smaller than a preset threshold value; and when the distance between the first geographical location and a second geographical location at which the cleaning device is currently located is not smaller than a preset threshold value, performing the cleaning operation according to a movement trajectory of the terminal, wherein the second cleaning mode is a tracking-type cleaning during which the distance between the cleaning device and the terminal is not smaller than the preset threshold value, wherein the performing the cleaning operation according to the movement trajectory of the terminal comprises:

acquiring the movement trajectory of the terminal;

during the cleaning operation performed according to the movement trajectory, acquiring a current distance between the cleaning device and the terminal in real time; and when the current distance between the cleaning device and the terminal is smaller than the preset threshold value, controlling the cleaning device to move gradually farther away from the terminal until the current distance between the cleaning device and the terminal is at least the preset threshold value, and continuing to perform the cleaning operation according to the movement trajectory.

11. The medium of claim 10, wherein the performing the cleaning operation according to the first geographical location and the specified cleaning mode comprises:

when the specified cleaning mode is a first cleaning mode, determining a first geographical area at which the terminal is currently located, according to the first geographical location; and controlling the cleaning device to perform the cleaning operation in one or more areas other than the first geographical area, wherein the first cleaning mode is an avoidance-type cleaning during which the cleaning device performs the cleaning operation in the one or more areas other than the first geographical area.

12. The medium of claim 11, wherein the method further comprises:

acquiring a map of the general area in which the cleaning device is currently located;

determining, according to the map, spatial boundaries of one or more geographical areas in the general area in which the cleaning device is currently located;

storing corresponding relationships between the geographical areas and the spatial boundaries;

wherein the determining the first geographical area in which the terminal is currently located according to the first geographical location comprises:

determining whether the first geographical location is in one set of the spatial boundaries in the corresponding relationships; and when the first geographical location is in one set of the spatial boundaries in the corresponding relationships, determining a geographical area corresponding to the one set of the spatial boundaries as the first geographical area.

13. The medium of claim 10, further comprising:

determining whether the terminal is being worn by the user based on one or more measured user parameters;

collecting user data;

building a user profile based on the collected user data; and determining the specified cleaning mode based on the user profile.

* * * * *